(12) United States Patent
Fukada et al.

(10) Patent No.: US 11,639,741 B2
(45) Date of Patent: May 2, 2023

(54) WET FRICTION PLATE AND WET MULTI-PLATE CLUTCH DEVICE

(71) Applicant: Kabushiki Kaisha F.C.C., Hamamatsu (JP)

(72) Inventors: Junichi Fukada, Shizuoka (JP); Junya Shirai, Shizuoka (JP); Masayuki Tsuchiya, Shizuoka (JP); Yusuke Miura, Shizuoka (JP)

(73) Assignee: Kabushiki Kaisha F.C.C., Shizuoka (JP)

(*) Notice: Subject to any disclaimer, the term of this patent is extended or adjusted under 35 U.S.C. 154(b) by 0 days.

(21) Appl. No.: 17/603,237

(22) PCT Filed: May 1, 2020

(86) PCT No.: PCT/JP2020/018468
§ 371 (c)(1),
(2) Date: Oct. 12, 2021

(87) PCT Pub. No.: WO2020/235341
PCT Pub. Date: Nov. 26, 2020

(65) Prior Publication Data
US 2022/0186789 A1    Jun. 16, 2022

(30) Foreign Application Priority Data
May 22, 2019    (JP) .............................. JP2019-095686

(51) Int. Cl.
*F16D 13/72* (2006.01)
*F16D 13/64* (2006.01)
*F16D 69/00* (2006.01)

(52) U.S. Cl.
CPC ........... *F16D 13/648* (2013.01); *F16D 13/72* (2013.01); *F16D 2069/004* (2013.01); *F16D 2300/10* (2013.01)

(58) Field of Classification Search
CPC .............. F16D 13/00–76; F16D 25/00–25/123
See application file for complete search history.

(56) References Cited

U.S. PATENT DOCUMENTS 7,958,984 B2 * 6/2011 Kobayashi ............ F16D 13/648
192/113.36
2007/0102258 A1   5/2007 Miyazaki et al.
(Continued)

FOREIGN PATENT DOCUMENTS

JP    H11141570 A   *  5/1999  ........... F16D 25/123
JP    2007-132362 A     5/2007
(Continued)

OTHER PUBLICATIONS

International Search Report (ISR) dated Jun. 30, 2020 filed in PCT/JP2020/018468.

*Primary Examiner* — Stacey A Fluhart
*Assistant Examiner* — Lillian T Nguyen
(74) *Attorney, Agent, or Firm* — Rankin, Hill & Clark LLP

(57) ABSTRACT

Provided are a wet friction plate and a wet multiplate clutch device capable of reduction drag torque while suppressing a decrease in the area of a friction member. The wet friction plate includes multiple friction members through oil grooves on a flat plate annular core metal. The friction member has first fine grooves opening at an inner peripheral edge of the friction member and extending to an outer peripheral edge side and second fine grooves opening at an outer peripheral edge of the friction member and extending to an inner peripheral edge side. The first fine groove and the second fine groove are formed to have a groove width of equal to or greater than 0.1 mm and equal to or less than 0.8 mm, and overlap portions overlapping with each other in a circumferential direction at the same position in a radial direction of the core metal.

6 Claims, 7 Drawing Sheets

(56) References Cited

U.S. PATENT DOCUMENTS

| | | |
|---|---|---|
| 2008/0006504 A1 | 1/2008 | Sudau et al. |
| 2012/0175216 A1 | 7/2012 | Hiramatsu et al. |
| 2016/0025158 A1 | 1/2016 | Kobayashi et al. |
| 2018/0216673 A1 | 8/2018 | Götz |

FOREIGN PATENT DOCUMENTS

| | | |
|---|---|---|
| JP | 2008-14493 A | 1/2008 |
| JP | 3149594 U | 4/2009 |
| JP | 2014-231852 A | 12/2014 |
| JP | 2016-23754 A | 2/2016 |
| JP | 2018-522176 A | 8/2018 |
| WO | 2011/033861 A1 | 3/2011 |

* cited by examiner

WET FRICTION PLATE AND WET MULTI-PLATE CLUTCH DEVICE

TECHNICAL FIELD

The present invention relates to a wet friction plate used in oil. Specifically, the present invention relates to a wet friction plate suitable for a wet multiplate clutch device and a wet multiplate clutch device. The wet multiplate clutch device is arranged between a motor and a drive target rotatably driven by the motor to transmit drive force of the motor to the drive target or block such transmission.

BACKGROUND ART

Typically, in a vehicle such as a four-wheeled automobile or a two-wheeled automobile, a wet multiplate clutch device is mounted to transmit rotary drive force of a motor such as an engine to a drive target such as a wheel or block such transmission. Generally, in the wet multiplate clutch device, two plates arranged facing each other are pressed against each other in lubricant oil to transmit or block the rotary drive force. Specifically, these two plates are a wet friction plate including a friction member provided on a surface of a flat plate annular core metal and a clutch plate including no friction member.

For such a multiplate clutch device, reduction in so-called drag torque has been constantly demanded for the purpose of improving the fuel efficiency of the vehicle on which the wet multiplate clutch device is mounted. The drag torque is torque transmitted between the wet friction plate and the clutch plate due to the viscous resistance of lubricant oil present between these two plates due to a rotation number difference between the wet friction plate and the clutch plate in the state of separation between the wet friction plate and the clutch plate. The drag torque is one cause for degradation of the fuel efficiency of the vehicle.

For this reason, Patent Literatures 1 and 2 below each disclose friction plates as wet friction plates. In this wet friction plate, a friction member bonded to a flat plate circular ring-shaped core plate along a circumferential direction is formed with a first oil groove extending outward of an inner edge portion of the friction member in a radial direction and a second oil groove extending inward of an outer edge portion of the friction member in the radial direction.

CITATION LIST

Patent Literature

PATENT LITERATURE 1: JP-A-2007-132362
PATENT LITERATURE 2: JP-A-2016-23754

However, in the friction plate described in each of Patent Literatures 1 and 2 above, the area of the oil groove needs to be large for causing the first oil groove to exert the effect of separating the friction plate and a separator plate arranged facing the friction plate. For this reason, the above-described typical friction plate has a problem that the area of the friction member in a trade-off relationship with the area of the oil groove is reduced and torque transmission properties of a wet multiplate clutch device including the friction plates are degraded.

The present invention has been made for coping with the above-described problem. An object of the present invention is to provide a wet friction plate and a wet multiplate clutch device capable of reducing drag torque while suppressing a decrease in the area of a friction member.

SUMMARY OF THE INVENTION

In order to achieve the above object, one feature of the present invention has a wet friction plate including multiple friction members arranged on a clutch friction plate through a clearance along a circumferential direction on a surface of a core metal formed in a flat plate annular shape, wherein each friction member has a first fine groove formed to have a groove width of equal to or greater than 0.1 mm and equal to or less than 0.8 mm, opening at an inner peripheral edge of the each friction member, extending toward an outer peripheral edge of the each friction member, and having a terminal end portion between the inner peripheral edge and the outer peripheral edge and a second fine groove formed to have a groove width of equal to or greater than 0.1 mm and equal to or less than 0.8 mm, opening at the outer peripheral edge, extending toward the inner peripheral edge, and having a terminal end portion between the outer peripheral edge and the inner peripheral edge, and the first fine groove and the second fine groove include at least one first fine groove and one second fine groove formed at positions adjacent to each other on one of the friction members, and have overlap portions overlapping with each other in the circumferential direction at an identical position in a radial direction of the core metal.

According to the feature of the present invention configured as described above, the wet friction plate is configured such that the first fine groove extending from the inner peripheral edge to the outer peripheral edge of the friction member and the second fine groove extending from the outer peripheral edge to the inner peripheral edge of the friction member are arranged adjacent to each other. Further, the groove width of each groove is equal to or greater than 0.1 mm and equal to or less than 0.8 mm. With this configuration, the drag torque can be reduced while a decrease in the area of the friction member is suppressed.

Another feature of the present invention is that in the wet friction plate, each overlap portion has at least a length of equal to or greater than ¼ of the length of each friction member in the radial direction of the core metal.

According to another feature of the present invention configured as described above, the wet friction plate is configured such that the overlap portion has at least a length of equal to or greater than ¼ of the length of the friction member in the radial direction of the core metal. Thus, the drag torque can be effectively reduced as compared to the case of forming an overlap portion with a length of less than ¼.

Furthermore, another feature of the present invention has the wet friction plate, wherein the first fine groove and the second fine groove are configured such that a ratio of the length of each overlap portion to an interval between the terminal end portion of the first fine groove and the second fine groove adjacent to the terminal end portion of the first fine groove in a circumferential direction of the core metal is equal to or greater than 1.5 and equal to or less than 4.

According to still another feature of the present invention configured as described above, in the wet friction plate, the first fine groove and the second fine groove are formed such that the ratio of the length of the overlap portion to the interval between the terminal end portion of the first fine groove and the second fine groove adjacent to such a terminal end portion in the circumferential direction of the core metal is equal to or greater than 1.5 and equal to or less than 4. Thus, according to experiment conducted by the present inventor et al., the drag torque can be effectively reduced as compared to a case where the above-described ratio is less than 1.5 or greater than 4. It is assumed that such an effect is provided in such a manner that lubricant oil having overflowed from the first fine groove is promptly recovered by the second fine groove through the overlap portion. Note that the interval between the terminal end portion of the first fine groove and the second fine groove adjacent to such a terminal end portion in the circumferential direction of the core metal is the length of a line or a concentric circle arc connecting the terminal end portion of the first fine groove and the second fine groove adjacent to such a terminal end portion along the circumferential direction of the core metal.

Furthermore, still another feature of the present invention has the wet friction plate according, wherein in at least one of the multiple friction members, at least one of the first fine groove and the second fine groove is formed to open at a side edge of the at least the one of the multiple friction members extending in the radial direction of the core metal.

According to still another feature of the present invention configured as described above, the wet friction plate is configured such that in at least one of the multiple friction members, the first fine groove and/or the second fine groove are formed to open at the side edge of the friction member extending in the radial direction of the core metal. Thus, in a case where these fine grooves are positioned on a backward side in a rotation direction upon rotation of the wet friction plate, lubricant oil on the friction member can quickly flow out of the friction member and the drag torque can be effectively reduced. In the wet friction plate, in a case where the first fine groove and/or the second fine groove is positioned on a forward side in the rotation direction upon rotation of the wet friction plate, lubricant oil present forward of these grooves can flow onto the friction member while the flow of such lubricant oil is disturbed. Thus, separation between the wet friction plate and a clutch plate can be promoted.

Still another feature of the present invention is, in the wet friction plate, that in at least one of the multiple friction members, a greater number of first fine grooves than that of the second fine grooves is formed on one of the friction members.

According to still another feature of the present invention configured as described above, in at least one of the multiple friction members, a greater number of first fine grooves than that of the second fine grooves is formed on one of the friction members. Thus, upon rotation of the wet friction plate, lubricant oil on an inner peripheral edge side of the friction member can be effectively guided into the first fine groove, and separation between the wet friction plate and the clutch plate can be promoted.

Still another feature of the present invention is that in the wet friction plate, the second fine groove is formed on each side of the first fine groove on one of the friction members.

According to still another feature of the present invention configured as described above, in at least one of the multiple friction members, the second fine groove is formed on each side of the first fine groove on one of the friction members. Thus, even in a case where the wet friction plate rotates in any of two rotation directions of the wet friction plate, lubricant oil guided onto the friction member can efficiently flow out in the radial direction, and the drag torque can be effectively reduced.

The present invention can be implemented not only as the invention relating to the wet friction plate, but also as the invention relating to the wet multiplate clutch device using the wet friction plate.

Specifically, a wet multiplate clutch device for transmitting rotary drive force of a motor to a driven shaft or blocking rotary drive force transmission, comprising the wet friction plate according to any one of claims 1 to 6; and a flat plate annular clutch plate to be pressed against or separated from the wet friction plate to transmit or block the rotary drive force.

According to this configuration, features and advantageous effects similar to those of the above-described wet friction plate can be expected from the wet multiplate clutch device.

DESCRIPTION OF EMBODIMENTS

Figure 1:
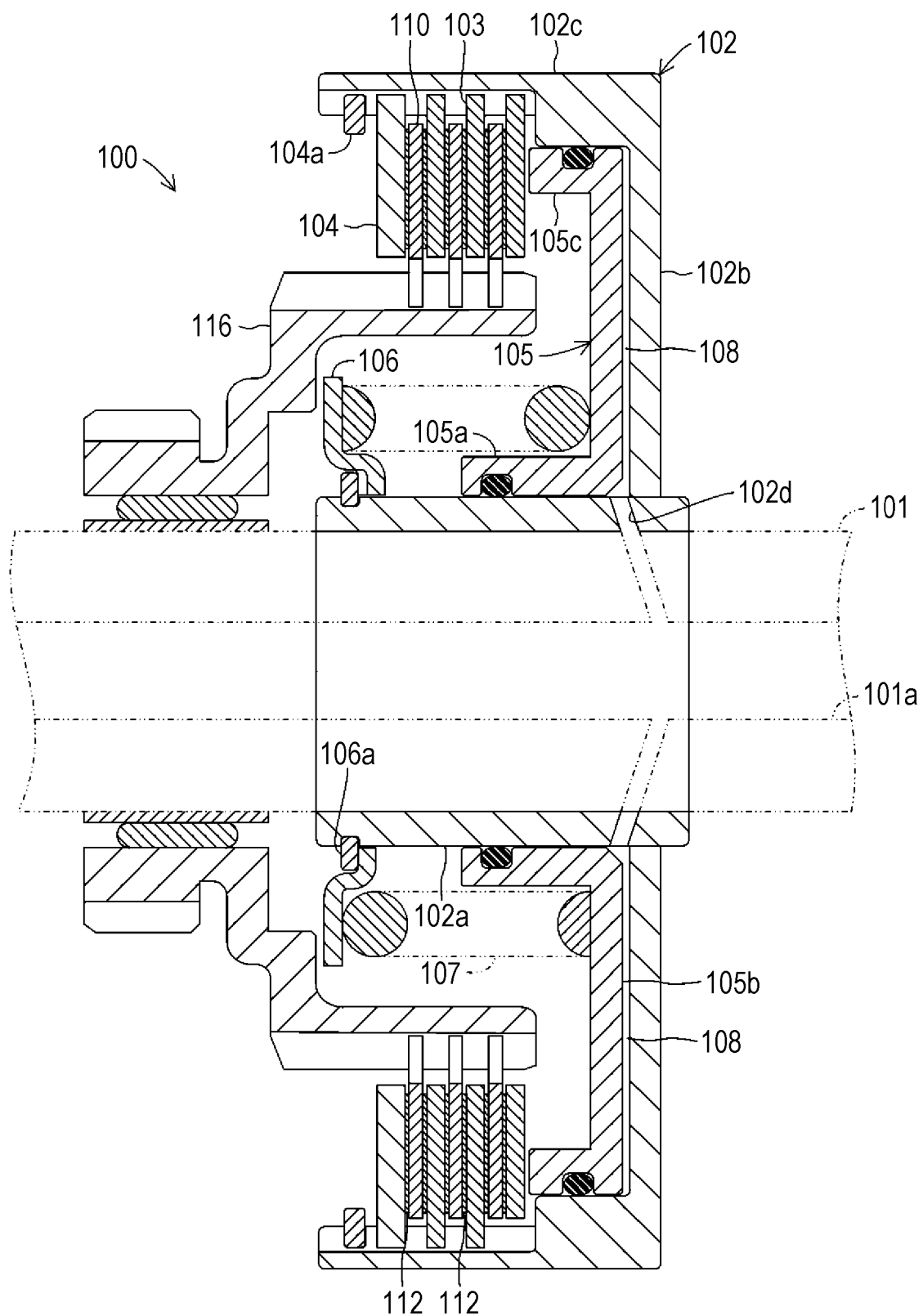
FIG. 1 is a sectional view showing an entire configuration of a wet multiplate clutch device including wet friction plates according to one embodiment of the present invention.

Hereinafter, one embodiment of a wet friction plate and a wet multiplate clutch device according to the present invention will be described with reference to the drawings. FIG. 1 is a sectional view showing the outline of an entire configuration of a wet multiplate clutch device 100 including wet friction plates 110 according to the present invention. Note that each figure referred in the present specification is schematically shown for the sake of easy understanding of the present invention, and for example, some components are exaggeratingly shown. Thus, the dimensions, ratios, etc. of the components vary in some cases. The wet multiplate clutch device 100 is a mechanical device for transmitting drive force of an engine (not shown) as a motor in a four-wheeled automobile to wheels (not shown) as a drive target or blocking such transmission. The wet multiplate clutch device 100 is provided in a transmission (not shown) arranged between the engine and each wheel.

(Configuration of Wet Multiplate Clutch Device 100)

The wet multiplate clutch device 100 is provided on an engine output shaft 101 connected to the engine as the motor through a not-shown flywheel. The engine output shaft 101 is a steel shaft body to be rotatably driven by actuation of the engine. The engine output shaft 101 functions, in the wet multiplate clutch device 100, as an input shaft configured to input rotary drive force of the engine. The engine output shaft 101 is formed in a hollow tubular shape. A hydraulic oil path 101a for supplying hydraulic oil to a later-described hydraulic oil chamber 108 or recovering hydraulic oil from the hydraulic oil chamber 108 is formed at the engine output shaft 101. A housing 102 is provided at an outer peripheral portion of the engine output shaft 101. Note that in FIG. 1, the engine output shaft 101 is indicated by a chain double-dashed line.

The housing 102 is a metal component holding clutch plates 103 and rotatably driven integrally with the engine output shaft 101. The housing 102 mainly includes each of a boss portion 102a, a flange portion 102b, and a holding portion 102c. The boss portion 102a is a portion integrally coupled to the engine output shaft 101. The boss portion 102a is formed in a cylindrical shape extending in an axis direction of the engine output shaft 101 and fitted onto an outer peripheral surface of the engine output shaft 101. A clutch piston 105 is housably fitted onto an outer peripheral portion of the boss portion 102a, and a spring receiver 106 is provided on the outer peripheral portion of the boss portion 102a in a fixed manner. Of the boss portion 102a, a portion between the flange portion 102b and the piston is formed with hydraulic oil distribution holes 102d through which not-shown hydraulic oil is distributed.

The flange portion 102b is a portion supporting the holding portion 102c with respect to the boss portion 102a. The flange portion 102b is formed, on an outer peripheral surface of one (the right side as viewed in the figure) end portion of the boss portion 102a, in a flat plate circular ring shape extending outwardly in a radial direction. The holding portion 102c is a portion holding the multiple (three in the present embodiment) clutch plates 103 and an end plate 104. The holding portion 102c is formed in a cylindrical shape extending in the axis direction of the engine output shaft 101. At an inner peripheral portion of the holding portion 102c, an internal spline for spline-fitting an outer peripheral portion of each of the clutch plates 103 and the end plate 104 is formed. With this configuration, the holding portion 102c holds, by spline fitting, the clutch plates 103 and the end plate 104 in a state in which these plates are displaceable along an axis direction of the housing 102 and are rotatable integrally with the housing 102.

The clutch plate 103 is a flat plate annular component to be pressed against the later-described wet friction plate 110 by the clutch piston 105. The clutch plate 103 is formed in such a manner that a thin plate member made of a steel plate cold commercial (SPCC) material is punched in an annular shape. In this case, an external spline to be fitted in the internal spline of the holding portion 102c of the housing 102 is formed at the outer peripheral portion of the clutch plate 103. The clutch plates 103 and the wet friction plates 110 are alternately arranged in the holding portion 102c of the housing 102.

The end plate 104 is a component for receiving each of the clutch plates 103 and the wet friction plates 110 pushed by the clutch piston 105. The end plate 104 is formed in such a manner that a thin plate member made of a steel plate cold commercial (SPCC) material is punched in an annular shape. In this case, an external spline to be fitted in the internal spline of the holding portion 102c of the housing 102 is formed at the outer peripheral portion of the end plate 104. Movement of the end plate 104 toward an opening side is restricted by a stopper ring 104a provided in a fixed manner at an opening-side end portion of the holding portion 102c of the housing 102.

The clutch piston 105 is a metal component for pressing the clutch plate 103 to bring the clutch plates 103 and the wet friction plates 110 into a pressure-contact state in which these plates closely contact each other with strong force. The clutch piston 105 mainly includes each of a sliding boss portion 105a, a flange portion 105b, and a pressing portion 105c. The sliding boss portion 105a is a cylindrical portion to be reciprocatably displaced along the axis direction on an outer peripheral surface of the boss portion 102a of the housing 102.

The flange portion 105b is a portion for receiving pressing force of a clutch spring 107 and forming the hydraulic oil chamber 108 between the flange portion 102b of the housing 102 and the flange portion 105b. The flange portion 105b is formed, on an outer peripheral surface of one (the right side as viewed in the figure) end portion of the sliding boss portion 105a, in a flat plate circular ring shape extending outwardly in the radial direction in parallel with the flange portion 102b.

The pressing portion 105c is a portion pressing the clutch plate 103 held on the holding portion 102c of the housing 102. The pressing portion 105c is, at a tip end portion of the flange portion 105b on the outside in the radial direction, formed in a circular ring shape protruding to a clutch plate 103 side.

The spring receiver 106 is a component for receiving one (the left side as viewed in the figure) end portion of the clutch spring 107. The spring receiver 106 is formed in a circular ring shape, and such a circular ring is configured such that an inner peripheral portion of the above-described one end portion of the clutch spring 107 is fitted in the circular ring in such a manner that an outer peripheral portion of a flat plate circular ring-shaped metal plate is bent to the left side as viewed in the figure in a step shape. Movement of the spring receiver 106 to the above-described one side is restricted by a stopper ring 106a provided in a fixed matter at one (the left side as viewed in the figure) end portion of the boss portion 102a of the housing 102.

The clutch spring 107 is a component for constantly pressing the clutch piston 105 to a side close to the flange portion 102b of the housing 102. The clutch spring 107 includes a metal coil spring. Of the clutch spring 107, one (the left side as viewed in the figure) end portion presses the spring receiver 106, and the other (the right side as viewed in the figure) end portion presses the flange portion 105b of the clutch piston 105.

The hydraulic oil chamber 108 is a portion for generating a hydraulic pressure for displacing the clutch piston 105 to the clutch plate 103 side. The hydraulic oil chamber 108 is a circular ring-shaped cavity portion formed between the flange portion 102b and the flange portion 105b facing each other. Hydraulic oil stored in the hydraulic oil path 101a of the engine output shaft 101 flows in or out of the hydraulic oil chamber 108 through the hydraulic oil distribution holes 102d by a not-shown hydraulic oil supply/discharge mechanism to be actuated according to driving operation of a driver.

Figure 2:
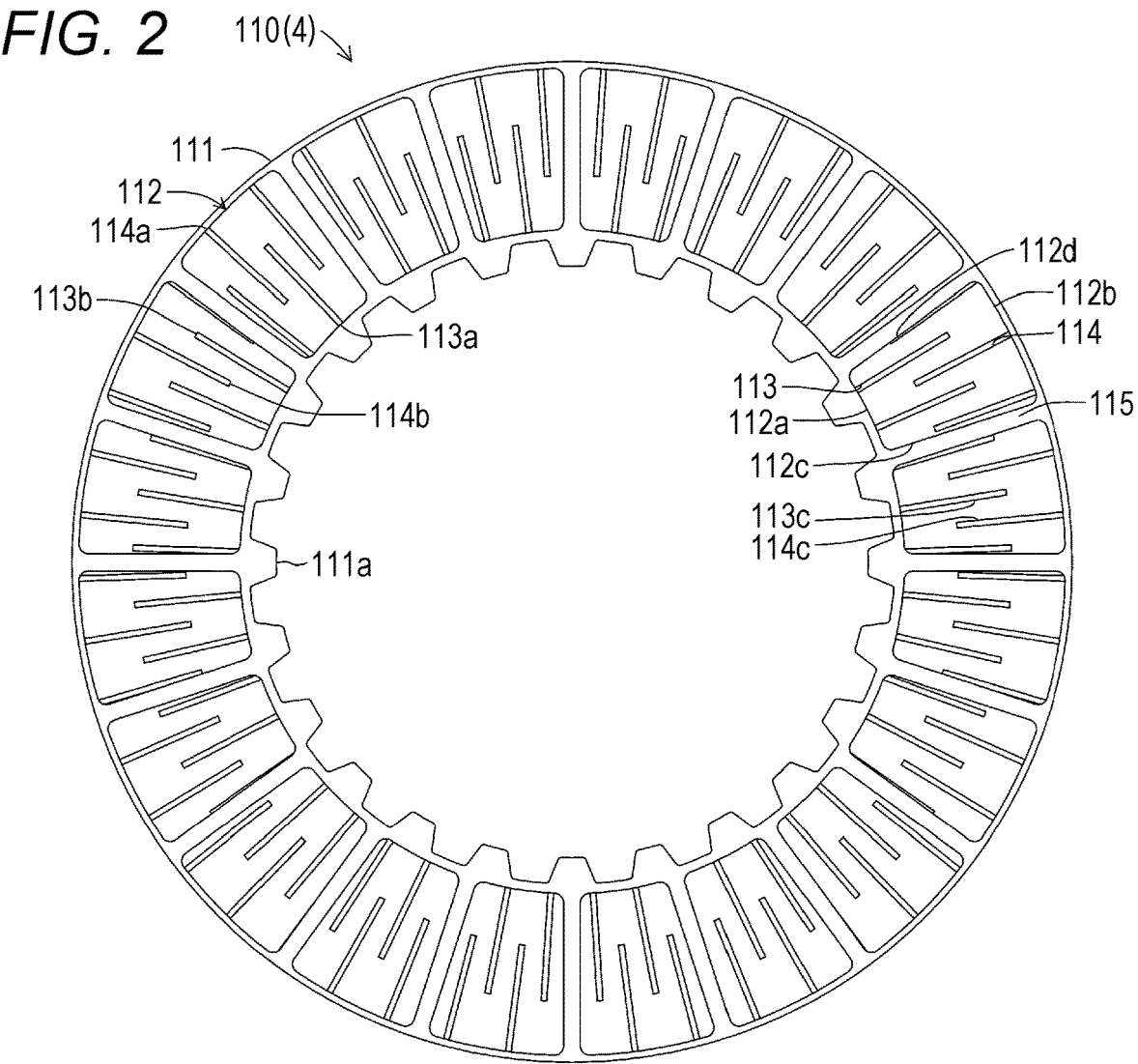
FIG. 2 is a plan view showing the outline of the appearance of the wet friction plate according to one embodiment of the present invention, the wet friction plate being incorporated into the wet multiplate clutch device shown in FIG. 1.
Figure 3:
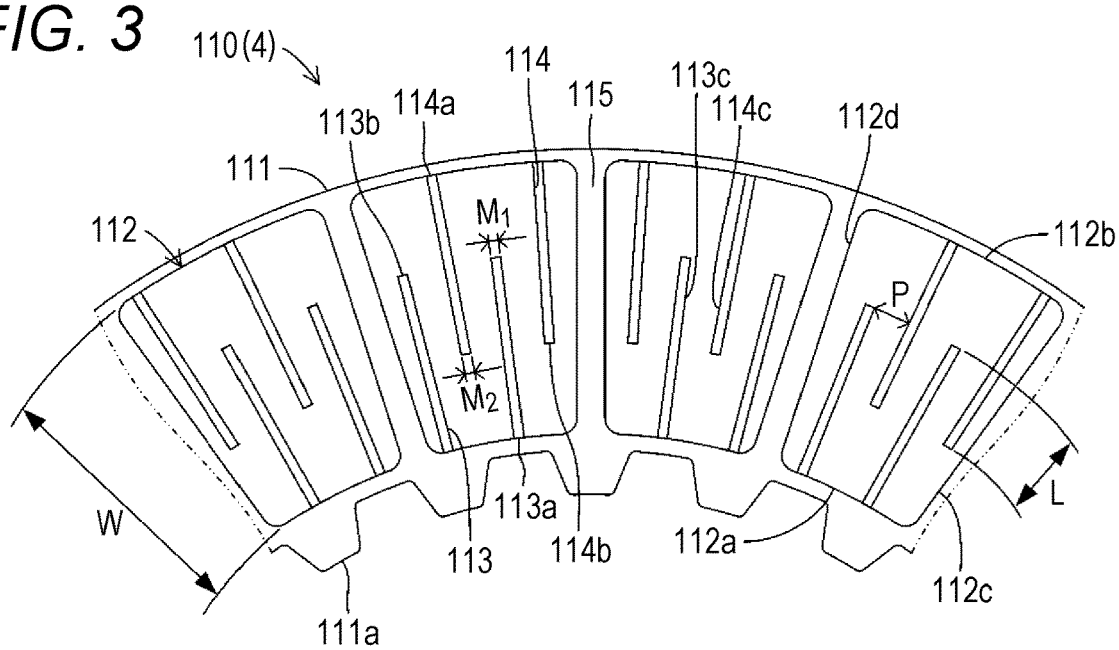
FIG. 3 is a partially-enlarged view of the wet friction plate shown in FIG. 2.

As shown in FIGS. 2 and 3, the wet friction plate 110 is a flat plate annular component to be pressed against the clutch plate 103. The wet friction plate 110 mainly includes, on a flat plate annular core metal 111, each of friction members 112 and oil grooves 115. The core metal 111 is a component as a base portion of the wet friction plate 110. The core metal 111 is formed in such a manner that a thin plate member made of a steel plate cold commercial (SPCC) material is punched in an annular shape. At an inner peripheral portion of the core metal 111, an internal spline 111a to be spline-fitted onto an outer peripheral portion of a later-described plate hub 116 is formed. On two plate surfaces of the core metal 111, the multiple small piece-shaped friction members 112 are radially provided through the oil grooves 115.

Each friction member 112 is a component for improving friction force for the clutch plate 103. Each friction member 112 is formed in such a manner that a paper material is formed in a small piece shape extending in a curved shape along a circumferential direction of the core metal 111. More specifically, each friction member 112 has four sides including an inner peripheral edge 112a, an outer peripheral edge 112b, and side edges 112c, 112d linearly extending at both end portions of each of the inner peripheral edge 112a and the outer peripheral edge 112b. The inner peripheral edge 112a extends in an arc shape along the direction of formation of the spline 111a formed at the inner peripheral portion of the core metal 111 to face such a spline 111a. The outer peripheral edge 112b extends in an arc shape in parallel along an outer peripheral edge of the core metal 111.

These friction members 112 are arranged through the oil grooves 115 along the circumferential direction of the core metal 111, and are bonded with a not-shown adhesive. In the present embodiment, 20 friction members 112 are fixed to each of two plate surfaces of the core metal 111 of the wet friction plate 110.

For each of these friction members 112, each of these friction members 112 includes first fine grooves 113 and second fine grooves 114. The first fine groove 113 is a groove in a recessed shape, has an opening 113a opening at the inner peripheral edge 112a of the friction member 112, extends linearly outwardly in a radial direction of the core metal 111, and has a terminal end portion 113b between the inner peripheral edge 112a and the outer peripheral edge 112b. The first fine groove 113 is formed to have a groove width of equal to or greater than 0.1 mm and equal to or less than 0.8 mm. In the present embodiment, the first fine groove 113 is formed such that a groove width $M_1$ is 0.6 mm and a depth is 0.2 mm. Note that in the present embodiment, the thickness of each friction member 112 is 0.4 mm. Such a thickness is determined as necessary according to the specifications of the wet multiplate clutch device 100.

The second fine groove 114 is a groove in a recessed shape, has an opening 114a opening at the outer peripheral edge 112b of the friction member 112, extends linearly inwardly in the radial direction of the core metal 111, and has a terminal end portion 114b between the inner peripheral edge 112a and the outer peripheral edge 112b. The second fine groove 114 is formed to have a groove width of equal to or greater than 0.1 mm and equal to or less than 0.8 mm.

In the present embodiment, the second fine groove 114 is formed such that a groove width $M_2$ is 0.6 mm and a depth is 0.2 mm.

The second fine grooves 114 are, at each friction member 112, formed at positions adjacent to the first fine grooves 113, and face the first fine grooves 113. That is, the first fine groove 113 and the second fine groove 114 have overlap portions 113c, 114c overlapping with each other in the circumferential direction at the same position in the radial direction of the core metal 111. In this case, the length L of the overlap portions 113c, 114c is set to ⅓ of the length W of the friction member 112 in the radial direction of the core metal 111.

For the first fine groove 113 and the second fine groove 114, the ratio (L/P) of the length L of the overlap portions 113c, 114c to an interval P between the terminal end portion 113b of the first fine groove 113 and the second fine groove 114 adjacent to such a terminal end portion 113b in the circumferential direction of the core metal 111 is set to 2.37. In the present embodiment, the interval P between the terminal end portion 113b of the first fine groove 113 and the second fine groove 114 adjacent to such a terminal end portion 113b in the circumferential direction of the core metal 111 may be the length of a line connecting the terminal end portion 113b of the first fine groove 113 and the second fine groove 114 adjacent to such a terminal end portion 113b along the circumferential direction of the core metal 111 or the length of an arc of a concentric circle connecting both of these portions.

At least one first fine groove 113 and at least one second fine groove 114 are formed at one friction member 112. In the present embodiment, two to three first fine grooves 113 and two to three second fine grooves 114 are formed at one friction member 112. In this case, the first fine grooves 113 and the second fine grooves 114 are alternately formed along the circumferential direction on one friction member 112.

Figure 4:
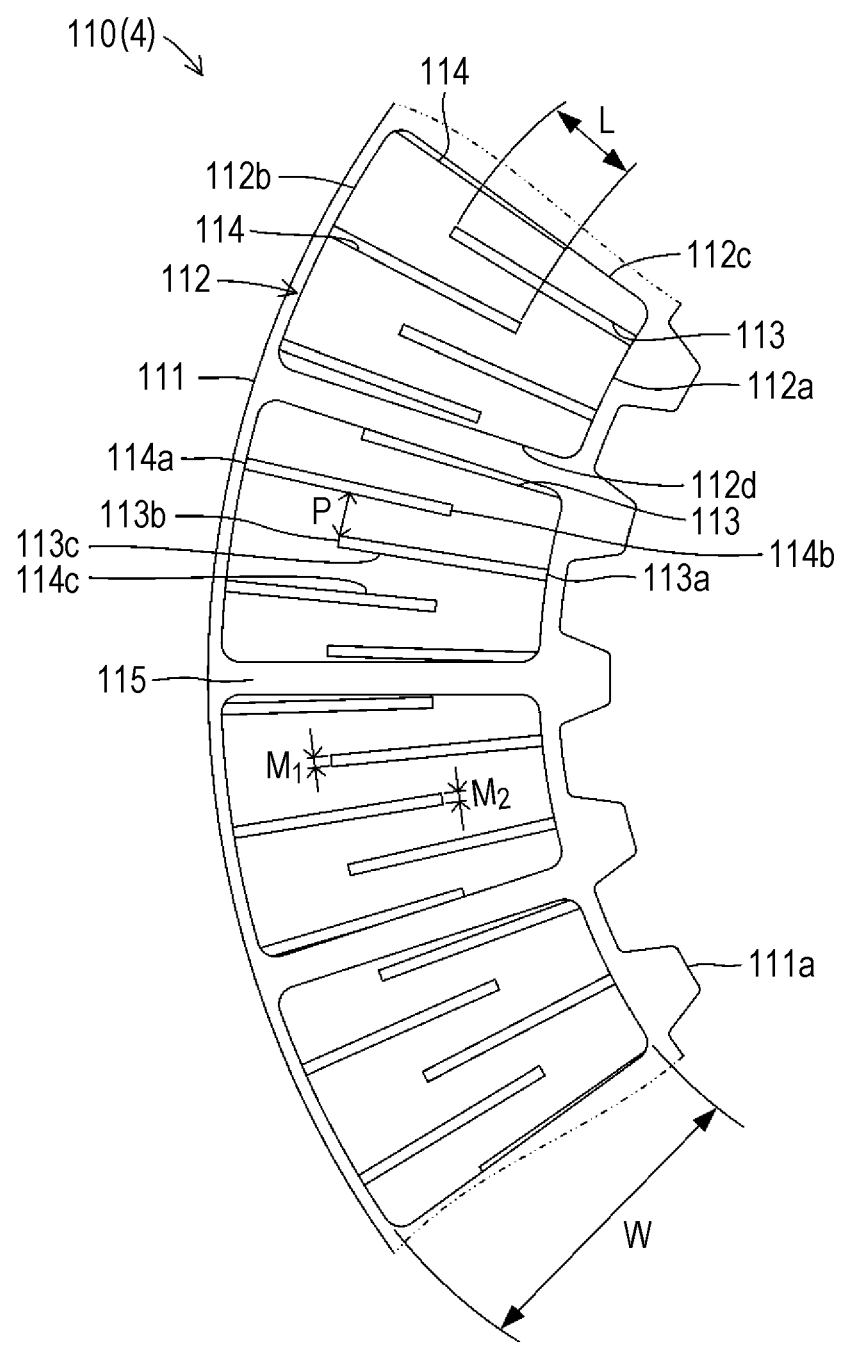
FIG. 4 is a partially-enlarged view of a portion, which is different from that shown in FIG. 3, of the wet friction plate shown in FIG. 2.

In this case, at some of the multiple friction members 112 provided on the core metal 111, the first fine groove 113 and the second fine groove 114 are formed to open at an end portion 112c or an end portion 112d of the friction member 112 as shown in FIG. 4. These first fine grooves 113 and these second fine grooves 114 are formed on the friction members 112 by press molding by pressing with a die or removal by laser irradiation.

Note that it may only be required that the friction member 112 is made of a material capable of improving friction force between the wet friction plate 110 and the clutch plate 103, and a material other than the paper material, such as a cork material, a rubber material, or a glass material, can be also used.

The oil groove 115 is a portion for distributing lubricant oil in a radial direction of the wet friction plate 110. The oil groove 115 is formed as a groove-shaped clearance extending in the radial direction between two friction members 112 arranged adjacent to each other in the circumferential direction. That is, the oil grooves 115 are radially formed on the core metal 111. Each of these oil grooves 115 is formed to have a groove width sufficiently wider than the groove widths $M_1$, $M_2$ of the first fine groove 113 and the second fine groove 114, specifically a groove width of equal to or greater than twice and equal to or less than ten times as wide as the groove widths $M_1$, $M_2$ of the first fine groove 113 and the second fine groove 114. In the present embodiment, the groove width of each oil groove 115 is formed three times as wide as the groove widths $M_1$, $M_2$ of the first fine groove 113 and the second fine groove 114.

The wet friction plates 110 configured as described above are arranged between ones of the multiple clutch plates 103 held on the holding portion 102c of the housing 102 and between the clutch plate 103 and the end plate 104, and are held on the plate hub 116. In the present embodiment, three wet friction plates 110 are held on the plate hub 116.

The plate hub 116 is a portion holding the multiple (three in the present embodiment) wet friction plates 110. The plate hub 116 is formed in a cylindrical shape extending in the axis direction of the engine output shaft 101. At one (the right side as viewed in the figure) outer peripheral portion of the plate hub 116, an external spline for spline-fitting an inner peripheral portion of the wet friction plate 110 is formed. With this configuration, the plate hub 116 holds, by spline fitting, the wet friction plates 110 in a state in which these wet friction plates 110 are displaceable along an axis direction of the plate hub 116 and are rotatable integrally with the plate hub 116. On the other hand, at the other (the left side as viewed in the figure) outer peripheral portion of the plate hub 116, an external gear for transmitting rotary drive force of the plate hub 116 to a wheel side as the drive target is formed.

The inside of the plate hub 116 is filled with a predetermined amount of lubricant oil (not shown). Such lubricant oil is supplied to between the clutch plate 103 and the wet friction plate 110, thereby preventing absorption of friction heat generated between the clutch plate 103 and the wet friction plate 110 and abrasion of the friction member 112.

(Actuation of Wet Multiplate Clutch Device 100)

Next, actuation of the wet multiplate clutch device 100 configured as described above will be described. The wet multiplate clutch device 100 is arranged between the engine and the transmission in the vehicle. The wet multiplate clutch device 100 transmits the drive force of the engine to the transmission or block such transmission according to the driving operation by the driver of the vehicle.

That is, in the wet multiplate clutch device 100, hydraulic oil is supplied into the hydraulic oil chamber 108 by traveling start operation by the driver (not shown) of the vehicle, and in this manner, the clutch piston 105 presses the clutch plate 103 such that the clutch plate 103 and the wet friction plates 110 pressure-contact each other. Accordingly, the wet multiplate clutch device 100 transmits rotary drive force of the housing 102 rotatably driven by the engine to the plate hub 116 coupled to a drive target side.

On the other hand, in the wet multiplate clutch device 100, hydraulic oil in the hydraulic oil chamber 108 is recovered into the engine output shaft 101 by traveling stop operation by the driver (not shown) of the vehicle, and in this manner, the state of pressing of the clutch plate 103 by the clutch piston 105 is canceled and the clutch plate 103 and the wet friction plates 110 are separated from each other. Accordingly, a rotary drive force transmission state between the housing 102 rotatably driven by the engine and the plate hub 116 coupled to the drive target side in the wet multiplate clutch device 100 is canceled.

In such a state that the clutch plates 103 and the wet friction plates 110 are separated from each other, direct friction contact among the clutch plates 103 and the wet friction plates 110 is canceled while these plates are brought into an indirect connection state by lubricant oil present among the clutch plates 103 and the wet friction plates 110. More specifically, lubricant oil contacting the friction members 112 on the wet friction plates 110 is mainly dragged by these friction members 112 due to viscous resistance, and therefore, the clutch plates 103 contacting such dragged lubricant oil are dragged due to the viscous resistance of the lubricant oil and the rotation speed thereof decreases.

Figure 5:
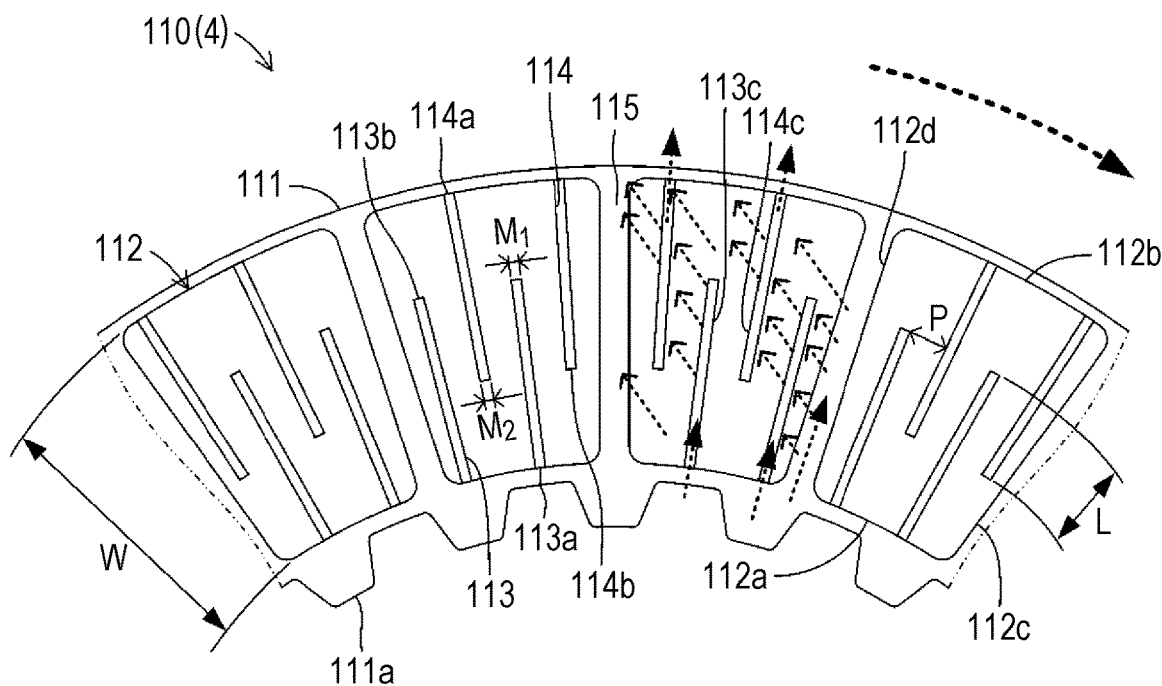
FIG. 5 is a partially-enlarged view of the wet friction plate for describing the flow of lubricant oil on a friction member in a case where the wet friction plate shown in FIG. 2 is rotatably driven clockwise as viewed in the figure.

In this case, part of lubricant oil present at an inner portion of the wet friction plate 110 flows in the first fine groove 113 of the friction member 112 through the opening 113a and flows out onto the friction member 112 through the vicinity of the terminal end portion 113b (see dashed arrows in FIG. 5), as shown in FIG. 5. Moreover, part of lubricant oil flowing in the inner peripheral edge 112a and the side edge 112c (or the side edge 112d) positioned on a forward side in a rotation direction (see a dashed arrow in FIG. 5) of the wet friction plate 110 and the oil groove 115 positioned on the forward side in such a rotation direction flows onto the friction member 112, and flows into the friction member 112 (see the dashed arrows in FIG. 5).

Of the multiple friction members 112, the friction member 112 configured such that the first fine groove 113 or the second fine groove 114 opens at the side edge 112c is, in this case, formed with the step-shaped side edge 112c. Thus, in a case where the side edge 112c is positioned on the forward side in the rotation direction upon rotation of the wet friction plate 110, the side edge 112c causes lubricant oil in the oil groove 115 to flow onto the friction member 112 while disturbing the flow of such lubricant oil. Moreover, in this case, the lubricant oil flowed onto the friction member 112 also contains air bubbles.

Such lubricant oil flowed onto the friction member 112 flows, on the friction member 112, backwardly in the rotation direction of the wet friction plate 110 and outwardly in the radial direction of the wet friction plate 110. Further, part of such lubricant oil flows into the second fine grooves 114, and is discharged from the friction member 112 through the terminal end portions 114b of the second fine grooves 114. Accordingly, it is assumed that torque to be transmitted, i.e., drag torque, decreases in the wet friction plate 110 by promotion of separation among the clutch plates 103 and the wet friction plates 110 and relaxation of an indirect friction contact state through lubricant oil.

Of the lubricant oil flowed onto the friction member 112, lubricant oil other than the lubricant oil discharged from the friction member 112 through the second fine grooves 114 flows out of the friction member 112 through a peripheral edge portion of the friction member 112. Of the multiple friction members 112, the friction member 112 configured such that the first fine groove 113 or the second fine groove 114 opens at the side edge 112d is formed with the step-shaped side edge 112d in this case. Thus, in a case where the side edge 112d is positioned on a backward side in the rotation direction upon rotation of the wet friction plate 110, the side edge 112d can cause the lubricant oil on the friction member 112 to quickly flow out of the friction member 112. With this configuration, the wet friction plate 110 can decrease the drag torque.

Figure 6:
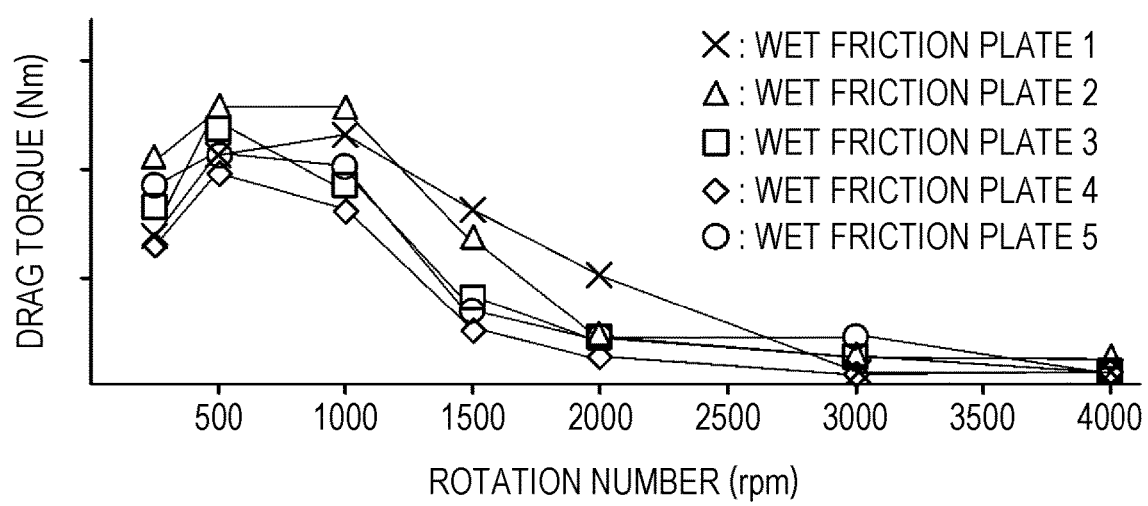
FIG. 6 is a graph showing comparison among drag torques for various overlap amounts for clarifying a relationship between the drag torque and the overlap amount between a first fine groove and a second fine groove in the wet friction plate according to the present invention.

Experimental results obtained by the present inventor et al. will be described herein. FIG. 6 is a graph showing the magnitude of the drag torque for each of the lengths L of the overlap portions 113c, 114c of the first fine groove 113 and the second fine groove 114. Note that in FIG. 6, torque values themselves indicated by the vertical axis are not necessary for verification of the advantage of the present invention, and for this reason, description thereof will be omitted.

Figure 7:
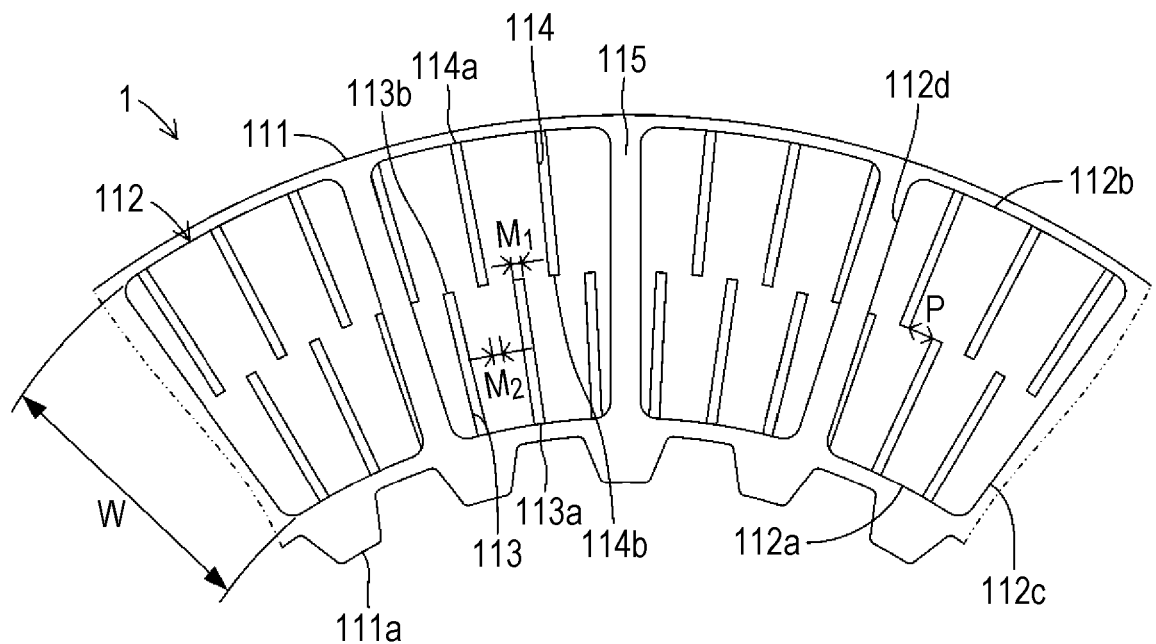
FIG. 7 is a partially-enlarged plan view showing the outline of the appearance of a wet friction plate 1 shown in FIG. 6.

The present inventor et al. prepared each of five wet friction plates 1 to 5 with different lengths L of the overlap portions 113c, 114c of the first fine groove 113 and the second fine groove 114. In this case, the total area of the friction members 112 on each of the wet friction plates 1 to 5 is the substantially same among the wet friction plates 1 to 5. As shown in FIG. 7, the wet friction plate 1 is a wet friction plate configured such that the first fine grooves 113 and the second fine grooves 114 have no overlap portions 113c, 114c and do not overlap with each other.

Figure 8:
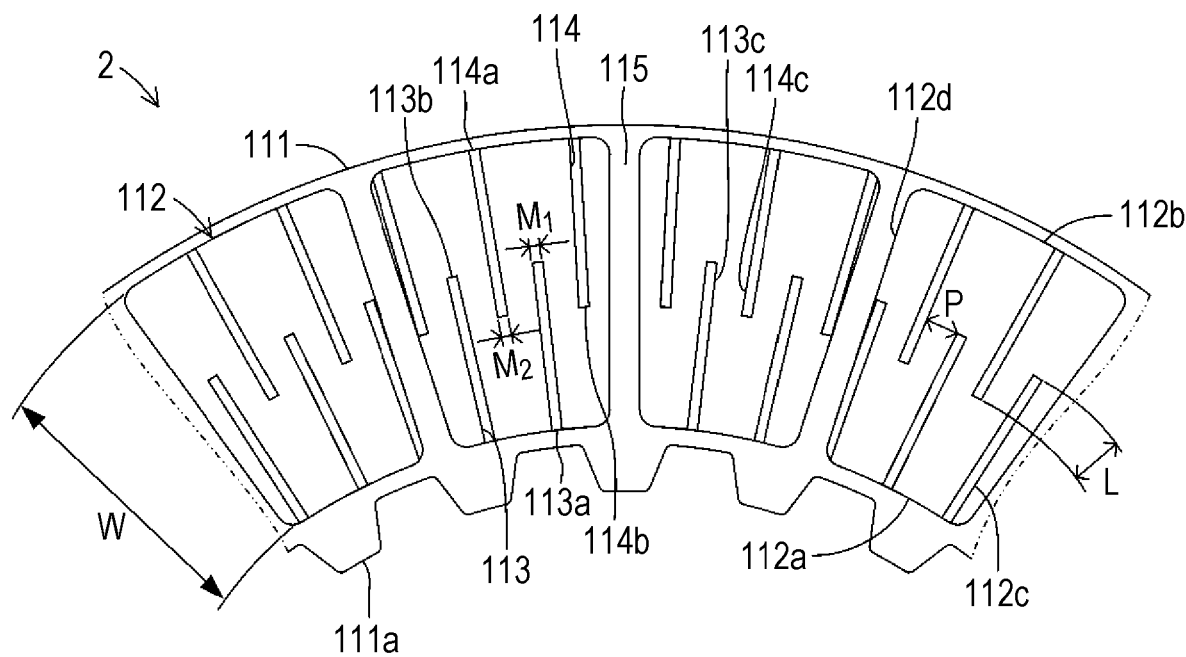
FIG. 8 is a partially-enlarged plan view showing the outline of the appearance of a wet friction plate 2 shown in FIG. 6.

In the wet friction plate 2, the overlap portions 113c, 114c are formed to have ⅙ of the length W of the friction member 112 in the radial direction of the core metal 111 as shown in FIG. 8. Moreover, in the wet friction plate 2, the ratio (L/P) of the length L of the overlap portions 113c, 114c to the interval P between the terminal end portion 113b of the first fine groove 113 and the second fine groove 114 adjacent to such a terminal end portion 113b in the circumferential direction of the core metal 111 is set to 1.46.

Figure 9:
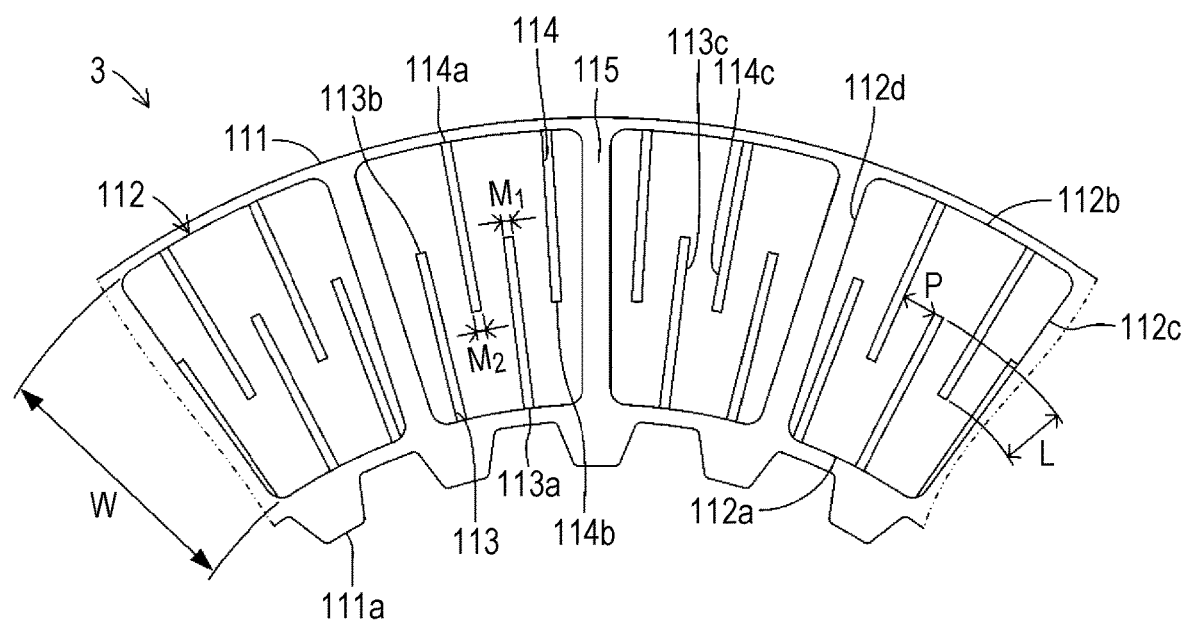
FIG. 9 is a partially-enlarged plan view showing the outline of the appearance of a wet friction plate 3 shown in FIG. 6.

In the wet friction plate 3, the overlap portions 113c, 114c are formed to have ¼ of the length W of the friction member 112 in the radial direction of the core metal 111 as shown in FIG. 9. Moreover, in the wet friction plate 3, the ratio (L/P) of the length L of the overlap portions 113c, 114c to the interval P between the terminal end portion 113b of the first fine groove 113 and the second fine groove 114 adjacent to such a terminal end portion 113b in the circumferential direction of the core metal 111 is set to 1.99.

In the wet friction plate 4, the overlap portions 113c, 114c are formed to have ⅓ of the length W of the friction member 112 in the radial direction of the core metal 111 as shown in each of FIGS. 2 to 5. Moreover, in the wet friction plate 4, the ratio (L/P) of the length L of the overlap portions 113c, 114c to the interval P between the terminal end portion 113b of the first fine groove 113 and the second fine groove 114 adjacent to such a terminal end portion 113b in the circumferential direction of the core metal 111 is set to 2.37. That is, the wet friction plate 4 has the same configuration as that of the wet friction plate 110 according to the present embodiment.

Figure 10:
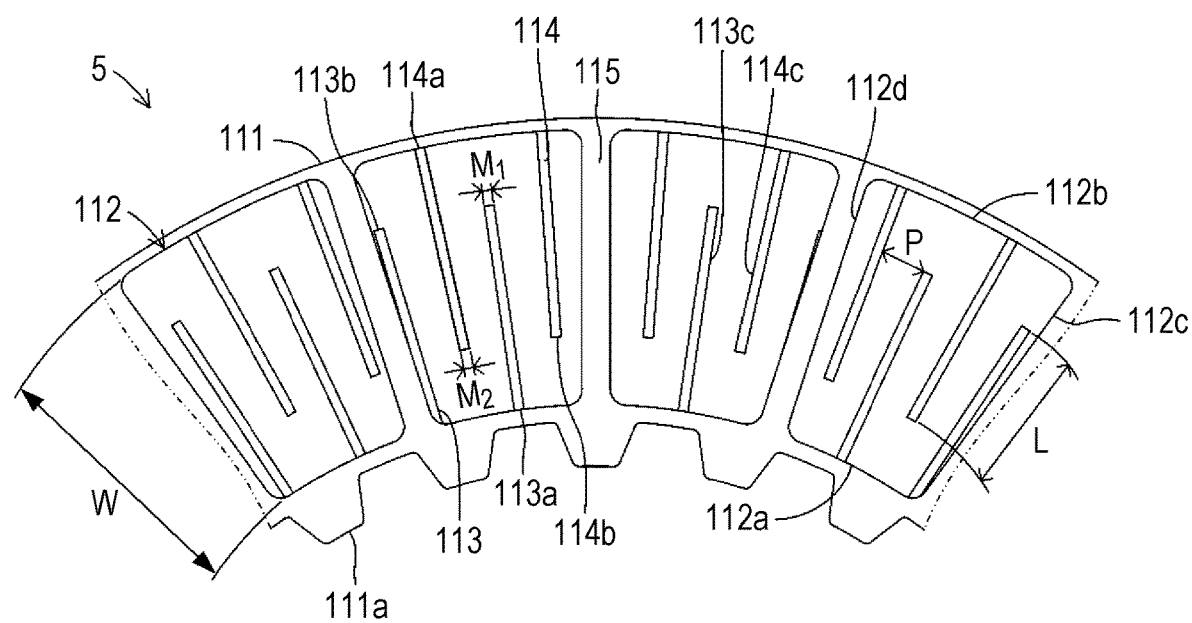
FIG. 10 is a partially-enlarged plan view showing the outline of the appearance of a wet friction plate 5 shown in FIG. 6.

In the wet friction plate 5, the overlap portions 113c, 114c are formed to have ½ of the length W of the friction member 112 in the radial direction of the core metal 111 as shown in FIG. 10. Moreover, in the wet friction plate 5, the ratio (L/P) of the length L of the overlap portions 113c, 114c to the interval P between the terminal end portion 113b of the first fine groove 113 and the second fine groove 114 adjacent to such a terminal end portion 113b in the circumferential direction of the core metal 111 is set to 3.05.

According to the experimental results shown in FIG. 6, the wet friction plates 2 to 5 according to the present invention can effectively reduce the drag torque within a rotation number range of 1500 rpm to 2000 rpm most employed upon traveling of the vehicle. Specifically, in the wet friction plates 3 to 5 according to the present invention, a drag torque reduction effect is noticeable. Specifically, the wet friction plate 3 can reduce the drag torque at 1500 rpm by about 50% as compared to the wet friction plate 1. Moreover, the wet friction plate 4 can reduce the drag torque at 1500 rpm by about 68% as compared to the wet friction plate 1. The wet friction plate 5 can reduce the drag torque at 1500 rpm by about 57% as compared to the wet friction plate 1. That is, in the wet friction plates 2 to 5 according to the present invention, the effect of reducing the drag torque as compared to the wet friction plate 1 is confirmed. Specifically, in the wet friction plates 3 to 5 according to the present invention, the drag torque reduction effect is further confirmed as compared to the wet friction plate 2 according to the present invention.

As can be understood from description of actuation above, in the wet multiplate clutch device 100, the first fine grooves 113 extending from the inner peripheral edge 112a of the friction member 112 to an outer peripheral edge 112b side and the second fine grooves 114 extending from the outer peripheral edge 112b of the friction member 112 to an inner peripheral edge 112a side are arranged adjacent to each other according to the above-described embodiment. Further, the groove width $M_1$, $M_2$ of each groove is equal to or greater than 0.1 mm and equal to or less than 0.8 mm. With this configuration, the drag torque can be reduced while a decrease in the area of the friction member 112 is suppressed.

Further, implementation of the present invention is not limited to the above-described embodiment, and various changes can be made without departing from the object of the present invention. Note that in each of variations described below, reference numerals corresponding to the reference numerals assigned to the wet friction plate 110 are used to represent elements similar to those of the wet friction plate 110 in the above-described embodiment and description thereof will be omitted.

For example, in the above-described embodiment, the groove width $M_1$, $M_2$ of each of the first fine groove 113 and the second fine groove 114 is 0.6 mm. However, it may only be required that the groove width $M_1$, $M_2$ of each of the first fine groove 113 and the second fine groove 114 is equal to or greater than 0.1 mm and equal to or less than 0.8 mm. In this case, the first fine groove 113 and the second fine groove 114 may be formed to have the same groove width, or may be formed to have different groove widths.

The depth of each of the first fine groove 113 and the second fine groove 114 is 0.2 mm. However, the depth of each of the first fine groove 113 and the second fine groove 114 can be shallower or deeper than 0.2 mm. In this case, the first fine groove 113 and the second fine groove 114 may be formed to have the same depth, or may be formed to have different depths. The first fine groove 113 and the second fine groove 114 may be formed such that the friction member 112 remains at a bottom portion of each groove. Alternatively, the first fine groove 113 and the second fine groove 114 may be formed in a cutout shape such that the friction member 112 does not remain in the bottom portion of each groove and the core metal 111 is exposed.

In the above-described embodiment, each of the first fine groove 113 and the second fine groove 114 is radially formed in the radial direction of the core metal 111. However, it may only be required that the first fine groove 113 and the second fine groove 114 are formed to extend from the inside to the outside in the radial direction of the core metal 111. Thus, the first fine grooves 113 and the second fine grooves 114 can be formed in parallel with each other.

In the above-described embodiment, the wet friction plate 110 is formed such that the overlap portions 113c, 114c have ⅓ of the length W of the friction member 112 in the radial direction of the core metal 111. However, it may only be required that the wet friction plate 110 is formed such that the overlap portions 113c, 114c have at least ⅙ of the length W of the friction member 112 in the radial direction of the core metal 111. More preferably, the overlap portions 113c, 114c may be formed to have at least ¼ of the length W.

In the above-described embodiment, for the first fine groove 113 and the second fine groove 114, the ratio (L/P) of the length L of the overlap portions 113c, 114c to the interval P between the terminal end portion 113b of the first fine groove 113 and the second fine groove 114 adjacent to such a terminal end portion 113b in the circumferential direction of the core metal 111 is set to 2.37. However, based on the above-described experimental results obtained by the present inventor et al., the first fine grooves 113 and the second fine grooves 114 are formed such that the ratio of the length of the overlap portions 113c, 114c to the interval P between the terminal end portion 113b of the first fine groove 113 and the second fine groove 114 adjacent to such a terminal end portion 113b in the circumferential direction of the core metal 111 is equal to or greater than 1.5 and equal to or less than 4. With this configuration, the drag torque can be effectively reduced. Note that formation of the first fine grooves 113 and the second fine grooves 114 with a ratio of less than 1.5 or greater than 4 is not denied.

In the above-described embodiment, in some of the friction members 112, the first fine groove 113 or the second fine groove 114 is formed to open at the side edge 112c or the side edge 112d. However, in all of the friction members 112, the first fine groove 113 or the second fine groove 114 can be formed to open at the side edge 112c or the side edge 112d. Alternatively, for the friction members 112, in all of the friction members 112, the first fine groove 113 or the second fine groove 114 can be formed not to open at the side edge 112c or the side edge 112d.

In the above-described embodiment, for the friction members 112, in some of the friction members 112, a greater number of first fine grooves 113 than the number of second fine grooves 114 is formed. Thus, upon rotation of the wet friction plate 110, lubricant oil on the inner peripheral edge 112a side of the friction member 112 can be effectively guided into the first fine grooves 113 in the wet friction plate 110, and separation among the wet friction plates 110 and the clutch plates 103 can be promoted. However, in the friction member 112, the same number of first fine grooves 113 as that of the second fine grooves 114 may be formed, or a smaller number of first fine grooves 113 than the number of second fine grooves 114 may be formed.

In the above-described embodiment, the second fine grooves 114 are formed on both sides of the first fine groove 113 in the radial direction of the core metal 111 on one of the friction members 112. With this configuration, even in a case where the wet friction plate 110 rotates in any of two rotation directions (clockwise and counterclockwise as viewed in the figure) of the wet friction plate 110, lubricant oil guided onto the friction member 112 can efficiently flow out in the radial direction, and the drag torque can be effectively reduced. However, in only some of all friction members 112, the second fine grooves 114 may be formed on both sides of the first fine groove 113 in the radial direction of the core metal 111 on one of the friction members 112. The friction member 112 can be also configured such that one first fine groove 113 and one second fine groove 114 are provided on one of the same friction members 112.

Figure 11:
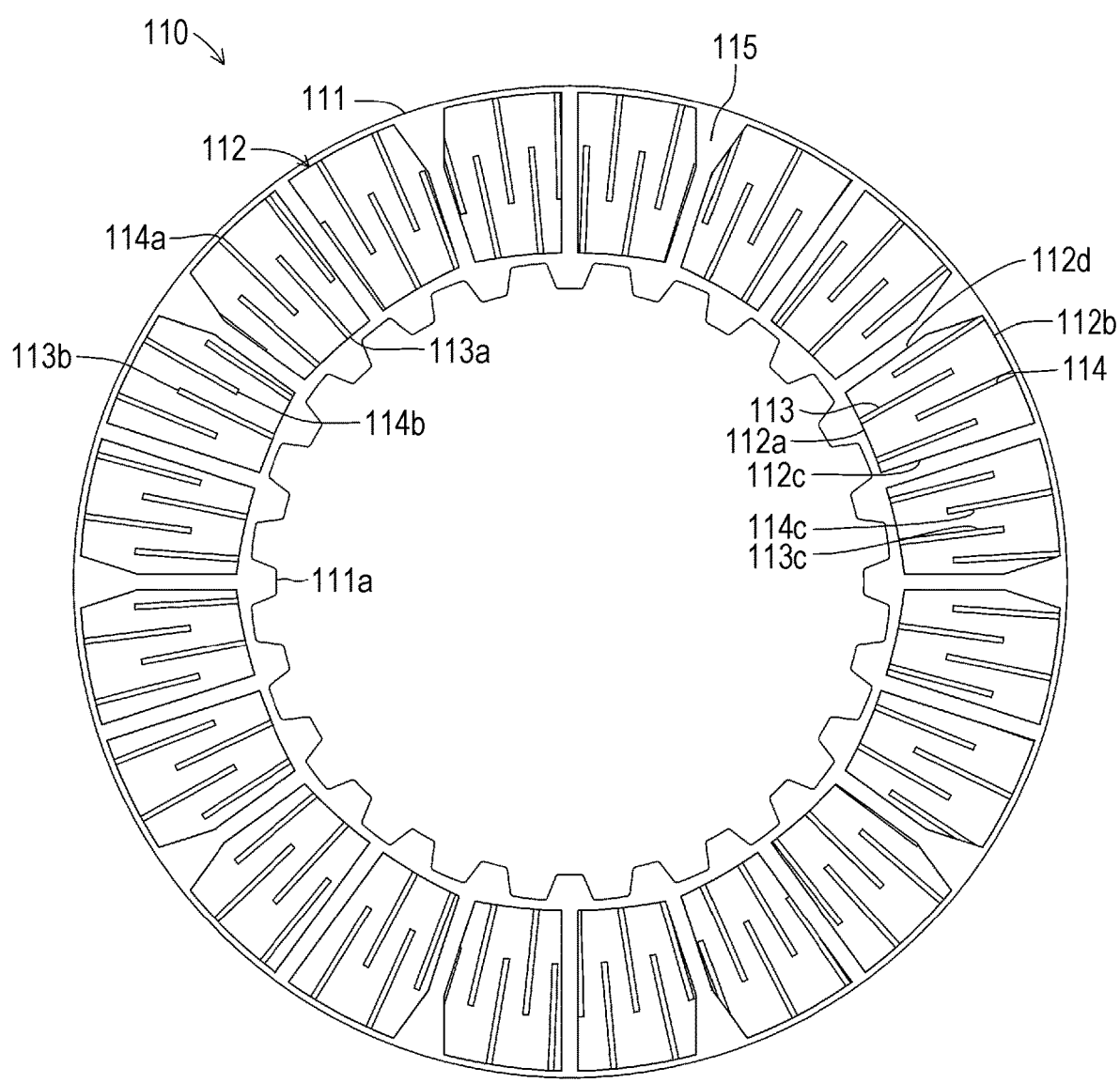
FIG. 11 is a plan view showing the outline of the appearance of a wet friction plate according to a variation of the present invention.

In the above-described embodiment, the oil groove 115 is formed to have a constant groove width from the inside to the outside in the radial direction of the core metal 111. However, the oil groove 115 can be formed such that the groove width expands at an outer portion in the radial direction of the core metal 111 as shown in, e.g., FIG. 11. Alternatively, the oil groove 115 can be also formed such that the groove width expands at an inner portion in the radial direction of the core metal 111.

In the above-described embodiment, the example where the wet friction plate according to the present invention is applied as the wet friction plate 110 used for the wet multiplate clutch device 100 of the four-wheeled automobile has been described. However, it may only be required that the wet friction plate according to the present invention is a wet friction plate used in oil. Thus, the wet friction plate according to the present invention may be, for example, used for a wet multiplate clutch device of a two-wheeled or three-wheeled automobile. In addition to the wet multiplate clutch device 100, the wet friction plate according to the present invention can be also applied as a friction plate used for a brake device configured to put a brake on rotation motion by a motor.

LIST OF REFERENCE SIGNS

W Length of Friction Member in Radial Direction
P Interval between First Fine Groove and Second Fine Groove in Circumferential Direction of Core Metal
$M_1$ Groove Width of First Fine Groove
$M_2$ Groove width of second fine groove
L Overlap amount between first fine groove and second fine groove
100 Wet multiplate clutch device
101 Engine output shaft
101a Hydraulic oil path
102 Housing
102a Boss portion
102b Flange portion
102c Holding portion
102d Hydraulic oil distribution hole
103 Clutch plate
104 End plate
104a Stopper ring
105 Clutch piston
105a Sliding boss portion
105b Flange portion
105c Pressing portion
106 Spring receiver
106a Stopper ring
107 Clutch spring
108 Hydraulic oil chamber
110 Wet friction plate
111 Core metal
111a Spline
112 Friction member
112a Inner peripheral edge
112b Outer peripheral edge
112c, 112d Side edge
113 First fine groove
113a Opening
113b Terminal end portion
113c Overlap portion
114 Second fine groove
114a Opening
114b Terminal end portion
114c Overlap portion
115 Oil groove
116 Plate hub

The invention claimed is:

1. A wet friction plate comprising:
a core metal formed in a flat plate annular shape; and
multiple friction members arranged on a surface of the core metal along a circumferential direction of the core metal through a clearance, the clearance extending in a radial direction of the core metal between two of the multiple friction members arranged adjacent to each other in the circumferential direction,
wherein each friction member has a first fine groove formed to have a groove width of equal to or greater than 0.1 mm and equal to or less than 0.8 mm, opening at an inner peripheral edge of the each friction member, extending toward an outer peripheral edge of the each friction member, and having a terminal end portion between the inner peripheral edge and the outer peripheral edge and a second fine groove formed to have a groove width of equal to or greater than 0.1 mm and equal to or less than 0.8 mm, opening at the outer peripheral edge, extending toward the inner peripheral edge, and having a terminal end portion between the outer peripheral edge and the inner peripheral edge, the first fine groove and the second fine groove include at least one first fine groove and one second fine groove formed at positions adjacent to each other on one of the friction members, and have overlap portions overlapping with each other in the circumferential direction at an identical position in the radial direction of the core metal, and in at least one of the multiple friction members, at least one of the first fine groove or the second fine groove is formed to open at a side edge of the at least one of the multiple friction members, the side edge extending in the radial direction of the core metal and being in direct contact with the clearance.

2. The wet friction plate according to claim 1, wherein each overlap portion has at least a length of equal to or greater than ¼ of a length of each friction member in the radial direction of the core metal.

3. The wet friction plate according to claim 1, wherein the first fine groove and the second fine groove are configured such that a ratio of the length of each overlap portion to an interval between the terminal end portion of the first fine groove and the second fine groove adjacent to the terminal end portion of the first fine groove in a circumferential direction of the core metal is equal to or greater than 1.5 and equal to or less than 4.

4. The wet friction plate according to claim 1, wherein in at least one of the multiple friction members, a greater number of first fine grooves than that of the second fine grooves is formed on one of the friction members.

5. The wet friction plate according to claim 1, wherein in at least one of the multiple friction members, the second fine groove is formed on each side of the first fine groove on one of the identical friction members.

6. A wet multiplate clutch device for transmitting rotary drive force of a motor to a driven shaft or blocking rotary drive force transmission, comprising:

the wet friction plate according to claim 1; and a flat plate annular clutch plate to be pressed against or separated from the wet friction plate to transmit or block the rotary drive force.

* * * * *